United States Patent
Deng et al.

(10) Patent No.: US 10,321,308 B2
(45) Date of Patent: Jun. 11, 2019

(54) METHOD OF REFRESHING A KEY IN A USER PLANE ARCHITECTURE 1A BASED DUAL CONNECTIVITY SITUATION

(71) Applicant: Alcatel Lucent, Boulogne Billancourt (FR)

(72) Inventors: Yun Deng, Shanghai (CN); Chandrika Worrall, Newbury (GB)

(73) Assignee: Alcatel Lucent, Nozay (FR)

( * ) Notice: Subject to any disclaimer, the term of this patent is extended or adjusted under 35 U.S.C. 154(b) by 108 days.

(21) Appl. No.: 15/127,730

(22) PCT Filed: Mar. 17, 2015

(86) PCT No.: PCT/IB2015/000632
§ 371 (c)(1),
(2) Date: Sep. 20, 2016

(87) PCT Pub. No.: WO2015/155559
PCT Pub. Date: Oct. 15, 2015

(65) Prior Publication Data
US 2017/0171748 A1   Jun. 15, 2017

(30) Foreign Application Priority Data
Mar. 21, 2014 (CN) .......................... 2014 1 0106898

(51) Int. Cl.
*H04L 29/06* (2006.01)
*H04W 12/04* (2009.01)
(Continued)

(52) U.S. Cl.
CPC ........... *H04W 12/04* (2013.01); *H04W 76/27* (2018.02); *H04W 76/30* (2018.02);
(Continued)

(58) Field of Classification Search
CPC .................................................... H04W 12/04
See application file for complete search history.

(56) References Cited

U.S. PATENT DOCUMENTS 9,844,047 B2 * 12/2017 Fukuta ............. H04W 72/0426
2007/0293224 A1   12/2007 Wang et al.
(Continued)

FOREIGN PATENT DOCUMENTS

CN     101228766     7/2008
CN     101945384     1/2011
(Continued)

OTHER PUBLICATIONS

3GPP: "3rd Generation Partnership Project; Technical Specification Group Services and System Aspects; 3GPP System Architecture Evolution (SAE); Security architecture (Release 12)," 3GPP TS 33.401 V12.10.0 pp. 1-109, XP055222042, (Dec. 2013).
(Continued)

*Primary Examiner* — Shawnchoy Rahman
(74) *Attorney, Agent, or Firm* — Fay Sharpe LLP

(57) ABSTRACT

The invention provides a method of refreshing a key in a user plane architecture 1A based dual connectivity situation. According to an embodiment of the present invention, a method, in a secondary eNB in a dual connectivity communication scenario, of refreshing a key, is provided, wherein a user equipment, a master eNB and a secondary eNB form dual connectivity, a user plane architecture 1A is applied for the dual connectivity, and the master eNB uses a master eNB key, the secondary eNB uses a secondary eNB key, the method comprises following steps: —receiving a new secondary eNB key from the master eNB; —receiving a key fresh complete from the master eNB, which indicates the user equipment has refreshed the secondary eNB key; —implementing a random access procedure with the user equipment; and —refreshing the secondary eNB key with
(Continued)

the new secondary eNB key, and implementing data transmission with the user equipment with the new secondary eNB key.

15 Claims, 4 Drawing Sheets

(51) Int. Cl.
*H04W 76/30* (2018.01)
*H04W 76/27* (2018.01)
*H04W 88/06* (2009.01)
*H04W 92/20* (2009.01)
*H04W 36/00* (2009.01)

(52) U.S. Cl.
CPC ........ *H04W 36/0069* (2018.08); *H04W 88/06* (2013.01); *H04W 92/20* (2013.01)

(56) References Cited

U.S. PATENT DOCUMENTS

| | | | | |
|---|---|---|---|---|
| 2009/0209259 | A1* | 8/2009 | Brusilovsky | H04W 12/04 455/438 |
| 2012/0178417 | A1 | 7/2012 | Hapsari et al. | |
| 2012/0300657 | A1 | 11/2012 | Jung et al. | |
| 2013/0114813 | A1* | 5/2013 | Chai | H04W 12/04 380/270 |
| 2016/0029213 | A1* | 1/2016 | Rajadurai | H04W 12/04 380/283 |
| 2016/0157095 | A1* | 6/2016 | Zhang | H04W 52/0209 380/273 |
| 2016/0198343 | A1* | 7/2016 | Heo | H04W 52/0251 380/270 |
| 2016/0337925 | A1* | 11/2016 | Fujishiro | H04W 16/32 |
| 2017/0034866 | A1* | 2/2017 | Wager | H04W 76/025 |
| 2017/0181216 | A1* | 6/2017 | Worrall | H04W 76/19 |
| 2017/0215185 | A1* | 7/2017 | Fukuta | H04W 72/0426 |

FOREIGN PATENT DOCUMENTS

| | | |
|---|---|---|
| CN | 102026176 | 4/2011 |
| CN | 102740289 | 10/2012 |
| CN | 102958052 | 3/2013 |
| CN | 103188663 | 7/2013 |
| JP | 2015185960 | 10/2015 |

OTHER PUBLICATIONS

3GPP, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN): Overall description; State 2 (Release 12) 3GPP TS 36.300 V12.0.0, pp. 1-208, XP055216928, (Dec. 2013).

ETSI MCC, "Draft Report of 3GPP TSG RAN WG2 meeting #85 held in Prague, Czech Republic, Feb. 10-14," 3GPP TSG-RAN Working Group 2 meeting #85bis, R2-14xxxx, pp. 1-145, XP055195147, Valencia, Spain, Mar. 31-Apr. 4, 2014.

Samsung, "SCG user pane security in 1A," $3^{rd}$ Generation Partnership Project (3GPP), 3GPP TSG RAN WG2 #85, R2-140335, pp. 1-4, XP050791724, Prague, Czech Republic, Feb. 10-14, 2014.

Ericsson, "SCE Discussions in SAE/LTE," $3^{rd}$ Generation Partnership Project (3GPP), 3GPP SA WG3 (Security) Meeting #74, S3-140211, 2 pages, XP050766499, Taipai, Taiwan, Jan. 20-24, 2014.

Huawei et al., "Security aspects of dual connectivity operation," $3^{rd}$ Generation Partnership Project (3GPP), 3GPP TSG-RAN WG2 Meeting #85, R2-140509, 6 pages, XP050791858, Prague, Czech Republic, Feb. 10-14, 2014.

International Search Report for PCT/IB2015/000632 dated Oct. 28, 2015.

Huawei, Hisillicon; "Security for SCE arc.1A", 3GPP TSG SA WG3 (Security) Meeting #74, Jan. 20-24, 2014, S3-140026.

Ericsson, "Security in dual connectivity", 3GPP TSG-RAN WG2 #82, Fukuoka, Japan, May 20-24, 2013. R2-131671.

* cited by examiner

METHOD OF REFRESHING A KEY IN A USER PLANE ARCHITECTURE 1A BASED DUAL CONNECTIVITY SITUATION

FIELD OF THE INVENTION

The present disclosure relates to mobile communication technology and particularly to a method of refreshing a key in a user plane architecture 1A based dual connectivity situation.

BACKGROUND OF THE INVENTION

Dual connectivity is an operation where a given UE consumes radio resources provided by at least two different network points (Master and Secondary eNBs) connected with non-ideal backhaul. RAN2 has agreed the control plane architecture for dual connectivity is C1: Only the MeNB generates the final RRC messages to be sent towards UE after the coordination of RRM functions between MeNB and SeNB, and UE only sends a RRC message to the MeNB. The user plane architecture is 1A and 3C. Readers can refer to TR36.842 for the details for architecture 1A. Architecture 1A refers to that a bearer severed by the SeNB and its user plan radio protocols (including PDCP, RLC and MAC) are all in the SeNB.

When architecture 1A is applied, for the bearers severed by the SeNB, PDCP entity is located in the SeNB, and PDCP entity is responsible for the encryption. Therefore, in the architecture 1A situation, there will two security keys for the MeNB and SeNB, respectively. In the present standards, only one single security key is provided for UE by the network. As described above, in the situation for a user plane architecture 1A based dual connectivity, it is also necessary to refresh the key. Therefore, the problem that how to refresh the key in the dual connectivity situation has not been solved yet.

SUMMARY OF THE INVENTION

According to the prior art, the present system only relates to a refreshment of a single security key. In view of this, this application provides feasible solutions to the refreshment for two keys in the dual connectivity situation when the user plane architecture 1A is configured.

According to a first aspect of the invention, there is proposed a method, in a master eNB in a dual connectivity communication scenario, of refreshing a key, wherein a user equipment, the master eNB and a secondary eNB form dual connectivity, a user plane architecture 1A is applied for the dual connectivity, and the master eNB uses a master eNB key, the secondary eNB uses a secondary eNB key, the method comprises following steps: —sending a first RRC connection reconfiguration to the user equipment, which indicates the user equipment to refresh the master eNB key; —generating a new secondary eNB key based on a new master eNB key and a freshness value, and sending the new secondary eNB key to the secondary eNB; —refreshing the master eNB key with the new master eNB key, and receiving a first RRC connection reconfiguration complete from the user equipment, which indicates the user equipment has refreshed the master eNB key; —receiving a key refresh acknowledgment from the secondary eNB, which includes configuration information used by the user equipment to access the secondary eNB; —sending a second RRC connection reconfiguration to the user equipment, which indicates the user equipment to refresh the secondary eNB key and includes the configuration information used by the user equipment to access the secondary eNB; —receiving a second RRC connection reconfiguration complete from the user equipment, which indicates the user equipment has refreshed the secondary eNB key; and —sending a key fresh complete to the secondary eNB, which indicates the user equipment has refreshed the secondary eNB key.

According to a second aspect of the invention, there is proposed a method, in a secondary eNB in a dual connectivity communication scenario, of refreshing a key, wherein a user equipment, a master eNB and the secondary eNB form dual connectivity, a user plane architecture 1A is applied for the dual connectivity, and the master eNB uses a master eNB key, the secondary eNB uses a secondary eNB key, the method comprises following steps: —receiving a new secondary eNB key from the master eNB; —sending a key refresh acknowledgment to the master eNB, which includes configuration information used by the user equipment to access the secondary eNB; —receiving a key fresh complete from the master eNB, which indicates the user equipment has refreshed the secondary eNB key; —implementing a random access procedure with the user equipment; and —refreshing the secondary eNB key with the new secondary eNB key, and implementing data transmission with the user equipment with the new secondary eNB key.

According to a third aspect of the invention, there is proposed a method, in a user equipment in a dual connectivity communication scenario, of refreshing a key, wherein the user equipment, a master eNB and a secondary eNB form dual connectivity, a user plane architecture 1A is applied for the dual connectivity, and the master eNB uses a master eNB key, the secondary eNB uses a secondary eNB key, the method comprises following steps: —receiving a first RRC connection reconfiguration from the master eNB, which indicates the user equipment to refresh the master eNB key; —generating a new master eNB key based on a root key, and refreshing the master eNB key with the new master eNB key, and sending a first RRC connection reconfiguration complete to the master eNB, which indicates the user equipment has refreshed the master eNB key; —receiving a second RRC connection reconfiguration from the master eNB, which indicates the user equipment to refresh the secondary eNB key and includes the configuration information used by the user equipment to access the secondary eNB; —generating a new secondary eNB key based on a new master eNB key and a freshness value, and refreshing the secondary eNB key with the new secondary eNB key, and sending a second RRC connection reconfiguration complete to the master eNB, which indicates the user equipment has refreshed the secondary eNB key; —implementing a random access procedure with the secondary eNB based on the configuration information; and —conducting PDCP reestablishment for a bear served by the secondary eNB and implementing data transmission with the secondary eNB with the new secondary eNB key.

According to a fourth aspect of the invention, there is proposed a method, in a master eNB in a dual connectivity communication scenario, of refreshing a key, wherein a user equipment, the master eNB and a secondary eNB form dual connectivity, a user plane architecture 1A is applied for the dual connectivity, and the master eNB uses a master eNB key, the secondary eNB uses a secondary eNB key, the method comprises following steps: —generating a new secondary eNB key based on a new master eNB key and a freshness value, and sending the new secondary eNB key to the secondary eNB; —receiving a key refresh acknowledgment from the secondary eNB, which includes configuration information used by the user equipment to access the secondary eNB; —sending a RRC connection reconfiguration to the user equipment, which indicates the user equipment to refresh the master eNB key and the secondary eNB key and includes the configuration information used by the user equipment to access the secondary eNB; —refreshing the master eNB key with the new master eNB key, and receiving a RRC connection reconfiguration complete from the user equipment, which indicates the user equipment has refreshed the master eNB key and the secondary eNB key; and —sending a key fresh complete to the secondary eNB, which indicates the user equipment has refreshed the secondary eNB key.

According to a fifth aspect of the invention, there is proposed a method, in a secondary eNB in a dual connectivity communication scenario, of refreshing a key, wherein a user equipment, a master eNB and the secondary eNB form dual connectivity, a user plane architecture 1A is applied for the dual connectivity, and the master eNB uses a master eNB key, the secondary eNB uses a secondary eNB key, the method comprises following steps: —receiving a new secondary eNB key from the master eNB; —sending a key refresh acknowledgment to the master eNB, which includes configuration information used by the user equipment to access the secondary eNB; —receiving a key fresh complete from the master eNB, which indicates the user equipment has refreshed the secondary eNB key; —implementing a random access procedure with the user equipment; and —refreshing the secondary eNB key with the new secondary eNB key, and implementing data transmission with the user equipment with the new secondary eNB key.

According to a sixth aspect of the invention, there is proposed a method, in a user equipment in a dual connectivity communication scenario, of refreshing a key, wherein the user equipment, a master eNB and a secondary eNB form dual connectivity, a user plane architecture 1A is applied for the dual connectivity, and the master eNB uses a master eNB key, the secondary eNB uses a secondary eNB key, the method comprises following steps: —receiving a RRC connection reconfiguration from the master eNB, which indicates the user equipment to refresh the master eNB key and the secondary eNB key and includes configuration information used by the user equipment to access the secondary eNB; —implementing a random access procedure with the secondary eNB based on the configuration information; —generating a new master eNB key based on a root key, generating a new secondary eNB key based on the new master eNB key and a freshness value, and refreshing the master eNB key with the new master eNB key, refreshing the secondary eNB key with the new secondary eNB key, and sending a RRC connection reconfiguration complete to the master eNB, which indicates the user equipment has refreshed the master eNB key and the secondary eNB key; and —conducting PDCP reestablishment for a bear served by the secondary eNB and implementing data transmission with the secondary eNB with the new secondary eNB key.

According to a seventh aspect of the invention, there is proposed a method, in a master eNB in a dual connectivity communication scenario, of refreshing a key, wherein a user equipment, the master eNB and a secondary eNB form dual connectivity, a user plane architecture 1A is applied for the dual connectivity, and the master eNB uses a master eNB key, the secondary eNB uses a secondary eNB key, the method comprises following steps: —sending a first RRC connection reconfiguration to the user equipment, which indicates the user equipment to refresh the master eNB key; —sending a dual connection release request to the secondary eNB; —refreshing the master eNB key with the new master eNB key, and receiving a first RRC connection reconfiguration complete from the user equipment, which indicates the user equipment has refreshed the master eNB key; —receiving a release response from the secondary eNB, which indicates that the secondary eNB has released the dual connection; —generating a new secondary eNB key based on the new master eNB key and a freshness value, and sending a dual connection establish request to the secondary eNB, which includes the new secondary eNB key; —receiving a dual connection establish response from the secondary eNB, which includes configuration information used by the user equipment to access the secondary eNB; —sending a second RRC connection reconfiguration to the user equipment, which includes the configuration information used by the user equipment to access the secondary eNB; —receiving a second RRC connection reconfiguration complete from the user equipment, which indicates the user equipment has configured the configuration information; and —sending a dual connection configuration complete to the secondary eNB, which indicates dual connection configuration is completed.

According to an eighth aspect of the invention, there is proposed a method, in a secondary eNB in a dual connectivity communication scenario, of refreshing a key, wherein a user equipment, a master eNB and the secondary eNB form dual connectivity, a user plane architecture 1A is applied for the dual connectivity, and the master eNB uses a master eNB key, the secondary eNB uses a secondary eNB key, the method comprises following steps: —receiving a dual connection release request from the master eNB; —releasing the dual connection, and sending a release response to the master eNB, which indicates that the secondary eNB has released the dual connection; —receiving a dual connection establish request from the master eNB, which includes the new secondary eNB key; —sending a dual connection establish response to the master eNB, which includes configuration information used by the user equipment to access the secondary eNB; —receiving a dual connection configuration complete from the master eNB, which indicates dual connection configuration is completed; —implementing a random access procedure with the user equipment; and —implementing data transmission with the user equipment with the new secondary eNB key.

According to a ninth aspect of the invention, there is proposed a method, in a user equipment in a dual connectivity communication scenario, of refreshing a key, wherein the user equipment, a master eNB and a secondary eNB form dual connectivity, a user plane architecture 1A is applied for the dual connectivity, and the master eNB uses a master eNB key, the secondary eNB uses a secondary eNB key, the method comprises following steps: —receiving a first RRC connection reconfiguration from the master eNB, which indicates the user equipment to refresh the master eNB key; —releasing configuration associated with the secondary eNB; —generating a new master eNB key based on a root key, refreshing the master eNB key with the new master eNB key, and sending a first RRC connection reconfiguration complete to the master eNB, which indicates the user equipment has refreshed the master eNB key; —receiving a second RRC connection reconfiguration from the master eNB, which includes the configuration information used by the user equipment to access the secondary eNB; —generating a new secondary eNB key based on the new master eNB key and a freshness value, and sending a second RRC connection reconfiguration complete to the master eNB, which indicates the user equipment has configured the configuration information; —implementing a random access procedure with the secondary eNB based on the configuration information; and —conducting PDCP reestablishment for a bear served by the secondary eNB and implementing data transmission with the secondary eNB with the new secondary eNB key.

Through the preferable embodiments of the present invention, the procedure for refreshing the key for the dual connection when two security keys are used is provided.

The respective aspects of the invention will become more apparent from the following description of particular embodiments.

BRIEF DESCRIPTION OF DRAWINGS

Other features, objects and advantages of the invention will become more apparent upon review of the following detailed description of non-limiting embodiments taken with reference to the drawings in which.

In the drawings, identical or like reference numerals denote identical or corresponding components or features throughout the different figures.

DETAILED DESCRIPTION OF EMBODIMENTS

When user plane architecture 1A is applicable in dual connectivity, the MeNB and the SeNB will use the key respectively. Thus, there are two security keys under this situation.

This application provides different solutions to realize key refresh in dual connectivity.

Solution 1: refreshing the MeNB key $K_{eNB}$ and the SeNB key S-$K_{eNB}$ in parallel. UE can still transmit data with the SeNB until the SeNB receives information regarding a new SeNB key S-$K_{eNB}$.

Solution 2: refreshing the MeNB key $K_{eNB}$ and the SeNB key S-$K_{eNB}$ simultaneously within one RRC connection reconfiguration.

Solution 3: refreshing the MeNB key $K_{eNB}$ at first and UE suspends its transmission with SeNB until information regarding a new SeNB key S-$K_{eNB}$ is obtained.

Solution 4: UE releases the configuration associated with the bearer served by the SeNB automatically, and then refreshes the MeNB key $K_{eNB}$ and the SeNB key S-$K_{eNB}$. Herein, the MeNB need establish the dual connection again.

Solution 5: UE releases the configuration associated with the bearer served by the SeNB according to the indication of the MeNB. This indication could be implemented in the RRC connection reconfiguration.

Within these solutions, solution 1 and solution 2 are preferred, because solution 1 will not have great impact on the user throughput; solution 2 can reduce signaling.

The above solutions would be described in details with respect to figures in the following.

Figure 1:
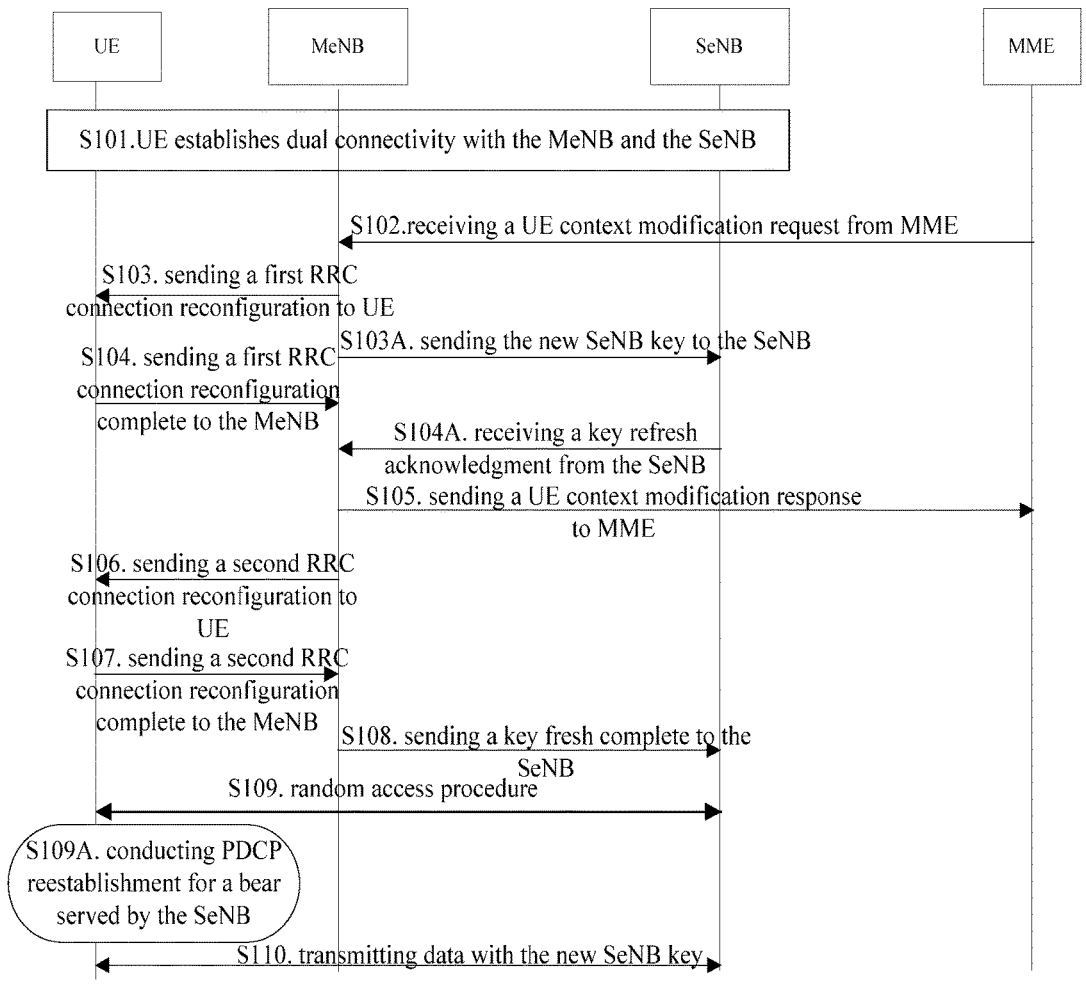
FIG. 1 illustrates a flow chart of a method of refreshing the MeNB key $K_{eNB}$ and the SeNB key S-$K_{eNB}$ in parallel according to an embodiment of the present invention.

FIG. 1 illustrates a flow chart of a method of refreshing the MeNB key $K_{eNB}$ and the SeNB key S-$K_{eNB}$ in parallel according to an embodiment of the present invention.

As shown in FIG. 1, in step S101, UE has established dual connectivity with the MeNB and the SeNB. Herein, 1A architecture is applicable by this UE. There are two security keys: $K_{eNB}$ and S-$K_{eNB}$. $K_{eNB}$ is used in the MeNB, and S-$K_{eNB}$ is used in the SeNB. Data transmission of the wireless interface requires encryption method. Specifically, the data will be encrypted, decrypted based on the MeNB key $K_{eNB}$ and the SeNB key S-$K_{eNB}$. This belongs to prior art and would not described in this patent.

In step S102, MME (Mobility Management Entity) sends a UE context modification request to the MeNB (which includes a new MeNB key $K_{eNB}$) to trigger the MeNB to refresh the current key.

Alternatively, in the other embodiments of the present invention, in step S102, the MeNB can decide independently that it is necessary to refresh the MeNB key $K_{eNB}$ without being triggered by MME. For example, the MeNB can trigger it is necessary to refresh the MeNB key $K_{eNB}$ according to a predetermined rule, so as to generate a new MeNB key $K_{eNB}$, without receiving a new MeNB key $K_{eNB}$ from MME.

In step S103, the MeNB sends a first RRC connection reconfiguration to UE, which indicates UE to refresh the MeNB key. Herein, specifically, the MeNB receives a new MeNB key $K_{eNB}$ from MME, and it quickly trigger intra-cell handover scenario to inform UE to refresh the MeNB key $K_{eNB}$. UE can obtain the MeNB key required to be refreshed through the indicator in the RRC connection reconfiguration (keyChangeIndicator is True, for example).

Advantageously, in the meanwhile, the MeNB will implement step S103A to send the new SeNB key to the SeNB. Specifically, the MeNB will generate a new SeNB key based on the new MeNB key and a freshness value, and send the new SeNB key to the SeNB.

Advantageously, the freshness value will be generated according to a predetermined rule. Herein, the predetermined rule includes the freshness value increases a predetermined value each time when the SeNB key needs to be refreshed. Thereby, the new SeNB key will be generated based on the freshness value after increasing a predetermined value and the new MeNB key.

In step S104, in response to step S103, UE will send a first RRC connection reconfiguration complete to the MeNB, which indicates UE has refreshed the MeNB key. Specifically, in this step, UE will conduct intra-cell handover, generate a new MeNB key $K_{eNB}$ based on a root key ($K_{ASME}$), and refresh the MeNB key $K_{eNB}$ with the new MeBN key. This root key usually has been already stored in UE. UE can obtain it through the predetermined method via a non-access stratum signaling and the pre-stored information. Herein, the MeNB will also refresh the MeNB key with the new MeBN key. Therefore, the communication between UE and the MeNB in and after the step S104 is based on the new MeNB key $K_{eNB}$, not the original MeNB key $K_{eNB}$.

Herein, the RRC connection reconfiguration in step S104 can be a part of the random access procedure between UE and the MeNB, or independent from this random access procedure.

When it is independent from this random access procedure, after UE proceeds the random access procedure successfully, it will send the abovementioned RRC connection reconfiguration complete to the MeNB.

And UE will conduct PDCP reestablishment for a bear served by the MeNB and implement data transmission (such as step S104 and the following steps) with the MeNB with the new MeNB key.

Advantageously, steps S103, S103A and S104 can be performed in parallel.

In step S104A, the MeNB receives a key refresh acknowledgment from the SeNB, which includes configuration information used by UE to access the SeNB. This configuration includes dedicated preamble, for example. Additionally, it further includes keyChangeIndicator (set as True) used in the SeNB. Herein, this patent does not limit the specific signaling for the key refresh acknowledgment the MeNB received from the SeNB in the practice.

In step S105, preferably, once the MeNB receives the RRC connection reconfiguration complete, it confirms that the refreshment for the key in the MeNB is successful, and sends a UE context modification response to MME.

In step S106, the MeNB sends a second RRC connection reconfiguration to UE, which indicates UE to refresh the SeNB key and includes the configuration information in step S104A used by UE to access the SeNB. Additionally, it can further includes keyChangeIndicator (set as True) used in the SeNB, to indicate UE to refresh the SeNB key.

Preferably, in some embodiments, this second RRC connection reconfiguration further includes the freshness value used to derive the new SeNB key in step S103A, such that UE can use this freshness value to derive the new SeNB key.

In step S107, UE sends a second RRC connection reconfiguration complete to the MeNB, which indicates UE has refreshed the SeNB key. Specifically, in this step, UE generates a new SeNB key based on the new MeNB key and a freshness value, and refreshes the SeNB key with the new SeNB key. As described above, this freshness value can be included in the second RRC connection reconfiguration. Alternatively, UE can derive this freshness value based on a predetermined rule pre-set with the MeNB. Herein, this predetermined rule includes the freshness value increases a predetermined value each time when the SeNB key needs to be refreshed. Thereby, the new SeNB key will be generated through the freshness value after increasing a predetermined value and the new MeNB key.

In step S108, the MeNB sends a key fresh complete to the SeNB, which indicates UE has refreshed the SeNB key.

In step S109, UE implements a random access procedure with the SeNB based on the configuration information (the dedicated preamble, for example). Specifically, UE performs the random access procedure in the cells managed by the SeNB. The specific access technology belongs to the prior art.

Herein, steps S108 and S109 can be performed in parallel, and they do not have a certain sequence.

In step S109A, UE conducts PDCP reestablishment for a bear served by the SeNB, so as to implement data transmission with the SeNB with the new SeNB key.

In step S110, after UE performs the random access procedure with the SeNB successfully, UE can transmit data with the SeNB with the new SeNB key S-$K_{eNB}$.

Figure 2:
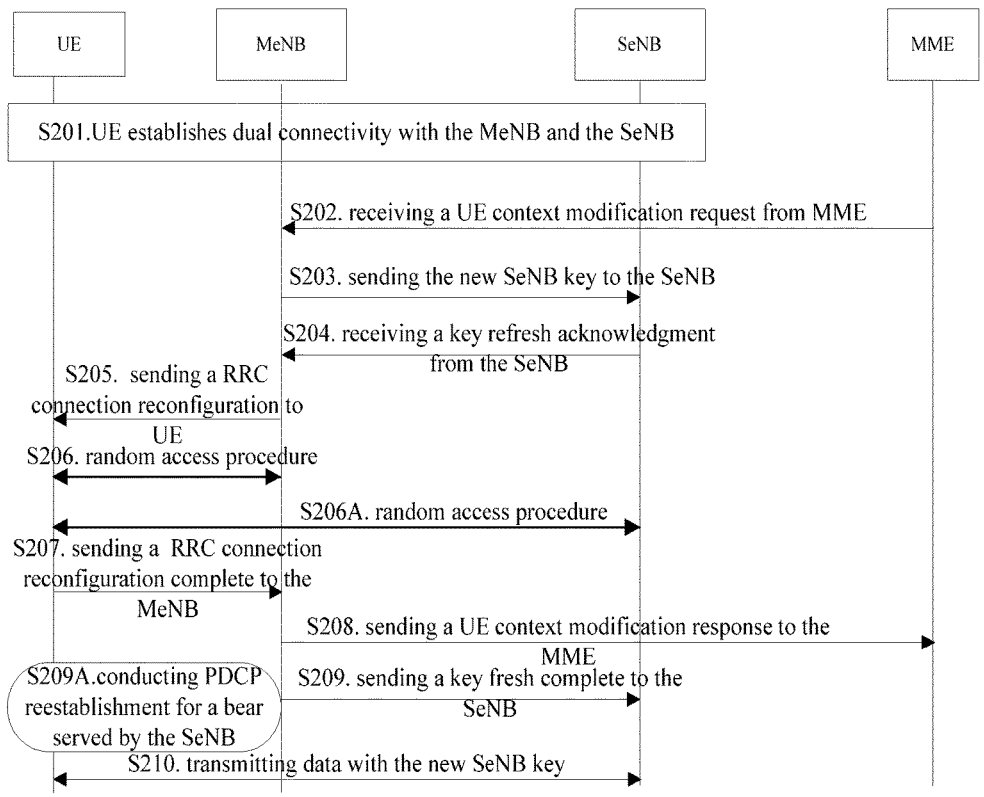
FIG. 2 illustrates a flow chart of a method of refreshing the MeNB key $K_{eNB}$ and the SeNB key S-$K_{eNB}$ with one RRC connection reconfiguration according to another embodiment of the present invention.

FIG. 2 illustrates a flow chart of a method of refreshing the MeNB key $K_{eNB}$ and the SeNB key S-$K_{eNB}$ with one RRC connection reconfiguration according to another embodiment of the present invention.

In step S201, UE has established dual connectivity with the MeNB and the SeNB. Herein, 1A architecture is applicable by this UE. There are two security keys: $K_{eNB}$ and S-$K_{eNB}$. $K_{eNB}$ is used in the MeNB, and S-$K_{eNB}$ is used in the SeNB.

In step S202, MME (Mobility Management Entity) sends a UE context modification request to the MeNB (which includes a new MeNB key $K_{eNB}$) to trigger the MeNB to refresh the current key.

Similarly, it is similar with step S102 in FIG. 1. Alternatively, in the other embodiments of the present invention, in step S202, the MeNB can decide independently that it is necessary to refresh the MeNB key $K_{eNB}$ without being triggered by MME. For example, the MeNB can trigger it is necessary to refresh the MeNB key $K_{eNB}$ according to a predetermined rule, so as to generate a new MeNB key $K_{eNB}$, without receiving a new MeNB key $K_{eNB}$ from MME.

In step S203, the MeNB send a new SeNB key to the SeNB. Specifically, the MeNB will generate the new SeNB key based on a new MeNB key and a freshness value at first.

Similar with the embodiment in FIG. 1, advantageously, the freshness value will be generated according to a predetermined rule. Herein, the predetermined rule includes the freshness value increases a predetermined value each time when the SeNB key needs to be refreshed. Thereby, the new SeNB key will be generated based on the freshness value after increasing a predetermined value and the new MeNB key.

In step S204, the MeNB receives a key refresh acknowledgment from the SeNB, which includes configuration information used by UE to access the SeNB. This configuration includes dedicated preamble, for example. Additionally, it further includes keyChangeIndicator (set as True) used in the SeNB, which indicates that the key refreshment has been confirmed, for example.

In step S205, the MeNB sends a RRC connection reconfiguration to UE, which indicates UE to refresh the MeNB key and the SeNB key. Herein, this RRC connection reconfiguration includes the configuration information used by UE to access the SeNB received in step S204. Preferably, this RRC connection reconfiguration includes two keyChangeIndicator, for example, which indicate UE to refresh the MeNB key and the SeNB key, respectively.

Preferably, this RRC connection reconfiguration further includes a freshness value used to derive a new SeNB key in step S203, such that UE can use this freshness value to derive the new SeNB key.

In steps S206 and S206A, UE performs the random access procedure with the MeNB and SeNB, respectively. Those two steps could be performed in parallel. Herein, UE will implement the random access procedure with the SeNB based on the configuration information (the dedicated preamble, for example) used by UE to access the SeNB.

In step S207, UE sends a RRC connection reconfiguration complete to the MeNB, which indicates UE has refreshed the MeNB key and the SeNB key. Specifically, UE will generate a new MeNB key based on a root key at first, and refresh the MeNB key with the new MeNB key. This root key usually has been already stored in UE. Then UE will generate the new SeNB key based on the new MeNB key and a freshness value, and refresh the MeNB key with the new MeNB key.

Herein, similar with the first embodiment, as described above, this freshness value could be included in the RRC connection reconfiguration. Alternatively, UE can derive this freshness value based on a predetermined rule set with the MeNB. Herein, this predetermined rule includes the freshness value increases a predetermined value each time when the SeNB key needs to be refreshed. Thereby, the new SeNB key will be generated through the freshness value after increasing a predetermined value and the new MeNB key.

Herein, the RRC connection reconfiguration in step S207 can be a part of the random access procedure between UE and the MeNB, or independent from this random access procedure.

When it is independent from this random access procedure, after UE proceeds the random access procedure successfully, it will send the abovementioned RRC connection reconfiguration complete to the MeNB.

And UE will conduct PDCP reestablishment for a bear served by the MeNB and the MeNB will refresh the MeNB key with the new MeNB key. Thereby, data transmission (such as step S207 and the following steps) with the MeNB can be implemented with the new MeNB key.

In step S208, the MeNB sends a UE context modification response to MME to indicate the key refreshment in the MeNB is successful.

In step S209, the MeNB sends a key fresh complete to the SeNB, which indicates UE has refreshed the SeNB key.

In step S209A, UE conducts PDCP reestablishment for a bear served by the SeNB, such that it can implement data transmission with the SeNB with the new SeNB key.

In step S210, after UE performs the random access procedure with the SeNB successfully, UE can transmit data with the SeNB with the new SeNB key S-$K_{eNB}$.

Similar with the first embodiment, it is appreciated for those skilled in the art there is no specific sequence among certain steps in this embodiment. Those steps could be implemented in parallel or in an opposite sequence. For example, steps S207 and S209A can be implemented at the same time.

Figure 3:
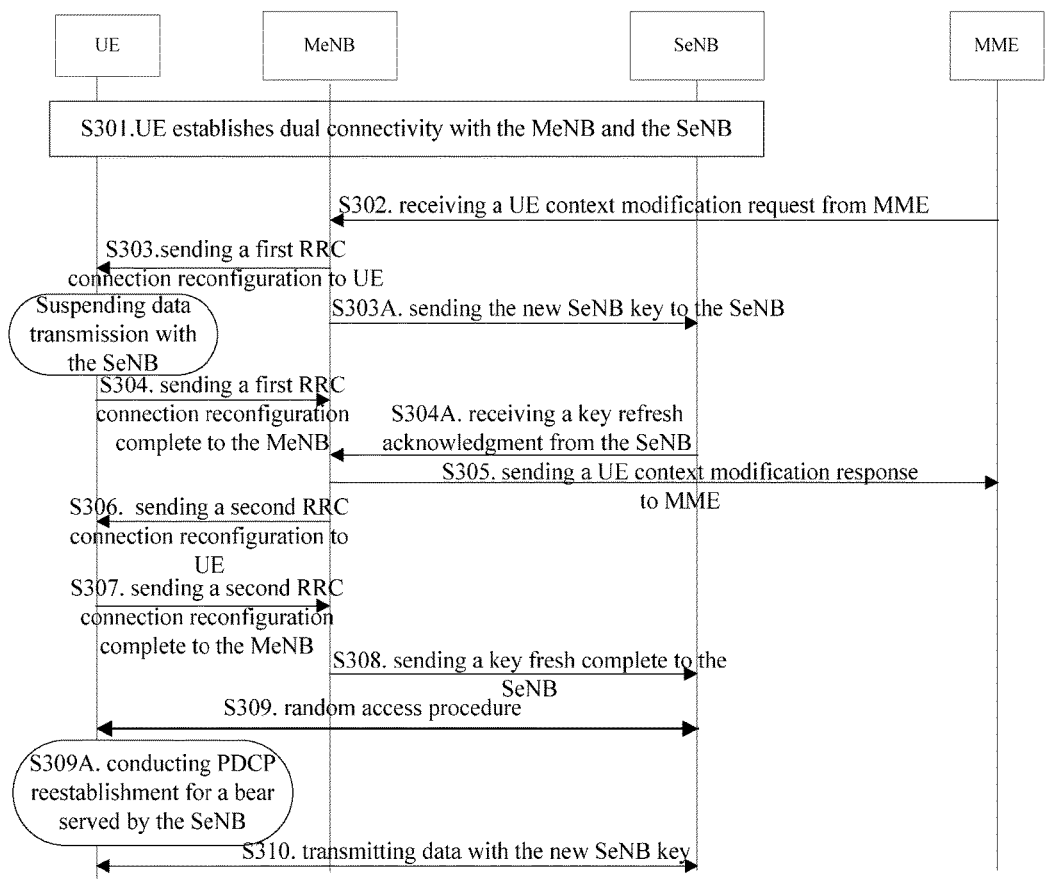
FIG. 3 illustrates a flow chart of a method of refreshing the MeNB key $K_{eNB}$ and the SeNB key S-$K_{eNB}$ according to a further embodiment of the present invention.

FIG. 3 illustrates a flow chart of a method of refreshing the MeNB key $K_{eNB}$ and the SeNB key S-$K_{eNB}$ according to a further embodiment of the present invention.

As shown in FIG. 3, after UE receives the first RRC connection reconfiguration and before receives the second RRC connection reconfiguration, US suspends the data transmission with the SeNB. This means, after UE receives the first RRC connection reconfiguration, it refreshes the MeNB key at first, and suspends the data transmission with the SeNB until UE receives the second RRC connection reconfiguration, which indicates to refresh the SeNB key.

Further, the steps in FIG. 3 are similar with those in FIG. 1 and would not be described in detail herein.

Figure 4:
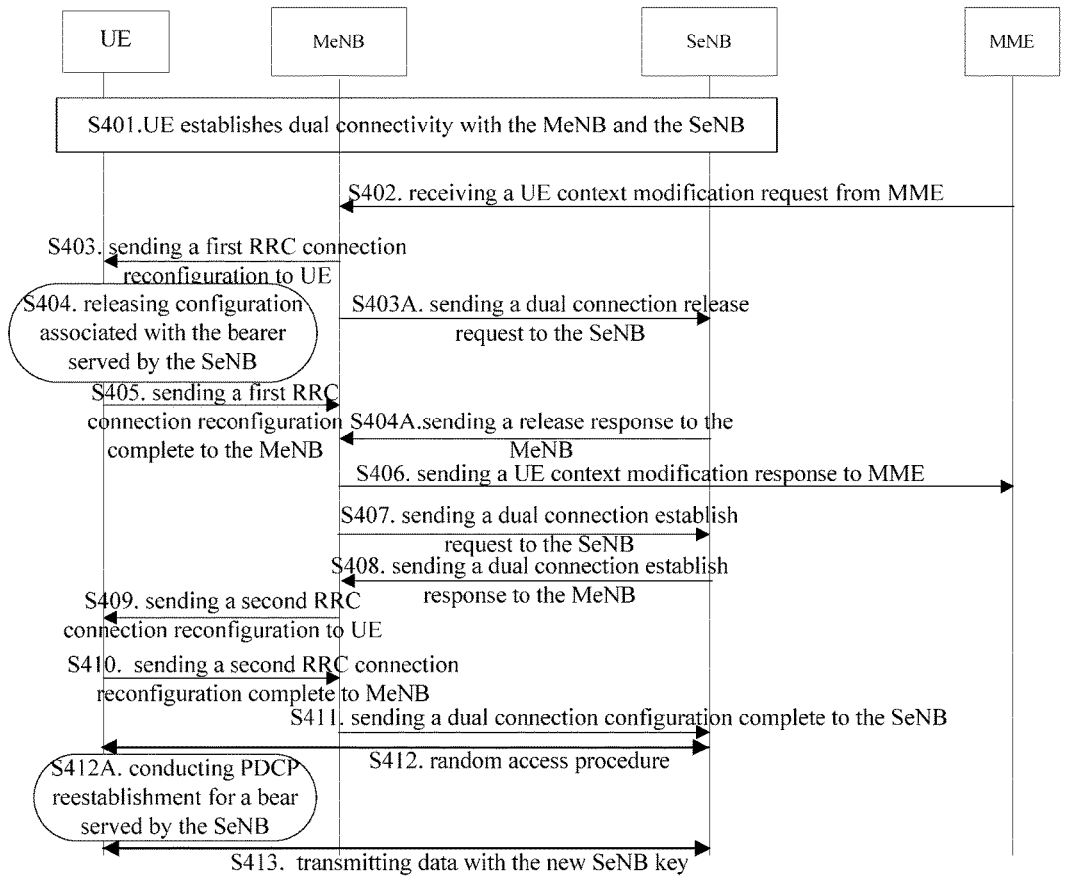
FIG. 4 illustrates a flow chart of a method of refreshing the MeNB key $K_{eNB}$ and the SeNB key S-$K_{eNB}$ by automatically releasing the configuration associated with the bearer of the SeNB according to a further embodiment of the present invention.

FIG. 4 illustrates a flow chart of a method of refreshing the MeNB key $K_{eNB}$ and the SeNB key S-$K_{eNB}$ by automatically releasing the configuration associated with the bearer of the SeNB according to a further embodiment of the present invention.

In step S401, UE has established dual connectivity with the MeNB and the SeNB. Herein, 1A architecture is applicable by this UE. There are two security keys: $K_{eNB}$ and S-$K_{eNB}$. $K_{eNB}$ is used in the MeNB, and S-$K_{eNB}$ is used in the SeNB.

In step S402, MME (Mobility Management Entity) sends a UE context modification request to the MeNB (which includes a new MeNB key $K_{eNB}$) to trigger the MeNB to refresh the current key.

Similar with the corresponding step in abovementioned embodiments, alternatively, in the other embodiments of the present invention, in step S402, the MeNB can decide independently that it is necessary to refresh the MeNB key $K_{eNB}$ without being triggered by MME. For example, the MeNB can trigger it is necessary to refresh the MeNB key $K_{eNB}$ according to a predetermined rule, so as to generate a new MeNB key $K_{eNB}$, without receiving a new MeNB key $K_{eNB}$ from MME.

In step S403, the MeNB sends a first RRC connection reconfiguration to UE, which indicates UE to refresh the MeNB key.

In step S404, UE releases configuration associated with the bearer served by the SeNB automatically. In this progress, the configuration associated with the SeNB will be released (the SeNB key will be released, for example). However, the bearer of the SeNB will be served by the MeNB, and UE will return to the present RRC state, or single connection state. The MeNB stores the information for the bearer served by the SeNB.

In another embodiment of the present invention (Solution 5), the first connection reconfiguration in step S403 further includes indication to indicate UE to release the configuration associated with the SeNB. Therefore, in step S404, UE will be triggered to release the configuration associated with the SeNB. The difference between the solution 5 and the embodiment in FIG. 4 is in that: in solution 5, when $K_{eNB}$ is refreshed, the release of the configuration associated with the SeNB is trigger by the MeNB.

In step S403A, the MeNB sends a dual connection release request to the SeNB.

In step S404A, the SeNB releases the dual connection (including releasing the SeNB key, for example), and sends a release response to the MeNB, which indicates that the SeNB has released the dual connection.

Herein, it is appreciated for those skilled in the art step S403 can be performed after step S403A or step S404A or be performed with them in parallel.

Then, in step S405, in response to step S403, UE sends a first RRC connection reconfiguration complete to the MeNB, which indicates UE has refreshed the MeNB key. Specifically, in this step, UE generates a new MeNB key $K_{eNB}$ based on a root key ($K_{ASME}$), and refreshes the MeNB key $K_{eNB}$ with the new MeNB key. This root key usually has been already stored in UE. Herein, the MeNB will also refresh the MeNB key with the new MeBN key. Therefore, the communication between UE and the MeNB in and after the step S405 is based on the new MeNB key $K_{eNB}$, not the original MeNB key $K_{eNB}$.

Herein, the RRC connection reconfiguration in step S405 can be a part of the random access procedure between UE and the MeNB, or independent from this random access procedure.

When it is independent from this random access procedure, after UE proceeds the random access procedure successfully, it will send the abovementioned RRC connection reconfiguration complete to the MeNB.

And UE will conduct PDCP reestablishment for a bear served by the MeNB (already including all bearers established by UE at this moment) so as to implement data transmission (such as step S405 and the following steps) with the MeNB with the new MeNB key.

In step S406, once the MeNB receives the first RRC connection reconfiguration complete, it confirms that the refreshment for the key in the MeNB is successful, and sends a UE context modification response to MME.

In step S407, the MeNB sends a dual connection establish request to the SeNB (Herein, the name of the specific signaling would not be defined is this patent). Herein, the MeNB will also generate the new SeNB key based on the new MeNB key and the freshness value, and include the new SeNB key in the above request. Herein, the concept of the freshness value is similar with the discussion above, and would not be discussed here in detail. Additionally, this dual connection request includes the information regarding the bearer which needs to be served by the SeNB, such that the SeNB could establish the dual connection again. Then, the SeNB can use the above new SeNB key to perform data communication with UE.

In step S408, the SeNB sends a dual connection establish response to the MeNB, which includes configuration information used by UE to access the SeNB. Additionally, this response represents that the SeNB accepts the bearer allocated by the MeNB in step S407, and will establish the dual connection with this bearer.

In step S409, MeNB sends a second RRC connection reconfiguration to UE, which includes the configuration information used by UE to access the SeNB, dedicated preamble, for example. Preferably, the second RRC connection reconfiguration further includes the freshness value used to derive the SeNB key in step S407.

In step S410, UE sends a second RRC connection reconfiguration complete to the MeNB, which indicates UE has configured the configuration information used by UE to access the SeNB.

Specifically, in this step, UE generates a new SeNB key based on the new MeNB key and a freshness value. As described above, this freshness value could be included in the second RRC connection reconfiguration. Alternatively, UE can derive this freshness value based on a predetermined rule pre-set with the MeNB. Herein, this predetermined rule includes the freshness value increases a predetermined value each time when the SeNB key needs to be refreshed (assuming that UE does not release the freshness value in step S404). Thereby, the new SeNB key will be generated through the freshness value after increasing a predetermined value and the new MeNB key. Further, in this step, UE will configure the above configuration.

In step S411, MeNB sends a dual connection configuration complete to the SeNB, which indicates dual connection configuration is completed.

In step S412, UE implements a random access procedure with the SeNB based on the configuration information configured previously.

In step S412A, UE conducts PDCP reestablishment for a bear served by the SeNB, such that it can implement data transmission with the SeNB with the new SeNB key.

In step S413, after UE performs the random access procedure with the SeNB successfully, UE can transmit date with the SeNB with the new SeNB key $S\text{-}K_{eNB}$.

It shall be appreciated that the foregoing embodiments are merely illustrative but will not limit the invention. Any technical solutions without departing from the spirit of the invention shall fall into the scope of invention, including that different technical features, methods appearing in different embodiments are used to combine to advantage.

The invention claimed is:

1. A method, in a master evolved node B (eNB) in a dual connectivity communication scenario, of refreshing a key, wherein a user equipment, the master eNB and a secondary eNB form dual connectivity, a user plane architecture 1A is applied for the dual connectivity, and the master eNB uses a master eNB key, the secondary eNB uses a secondary eNB key, the method comprises:
  sending a first Radio Resource Control (RRC) connection reconfiguration to the user equipment, which indicates the user equipment to refresh the master eNB key;
  generating a new secondary eNB key based on a new master eNB key and a freshness value, and sending the new secondary eNB key to the secondary eNB;
  refreshing the master eNB key with the new master eNB key, and receiving a first RRC connection reconfiguration complete from the user equipment, which indicates the user equipment has refreshed the master eNB key;
  receiving a key refresh acknowledgment from the secondary eNB, which includes configuration information used by the user equipment to access the secondary eNB;
  sending a second RRC connection reconfiguration to the user equipment, which indicates the user equipment to refresh the secondary eNB key and includes the configuration information used by the user equipment to access the secondary eNB;
  receiving a second RRC connection reconfiguration complete from the user equipment, which indicates the user equipment has refreshed the secondary eNB key; and
  sending a key fresh complete to the secondary eNB, which indicates the user equipment has refreshed the secondary eNB key.

2. A method according to claim 1, wherein the second RRC connection reconfiguration further includes the freshness value.

3. A method according to claim 1, wherein the freshness value increases a predetermined value each time when the secondary eNB key needs to be refreshed.

4. A secondary evolved node B (eNB) in a dual connectivity communication scenario, of refreshing a key, wherein a user equipment, a master eNB and the secondary eNB form dual connectivity, a user plane architecture 1A is applied for the dual connectivity, and the master eNB uses a master eNB key, the secondary eNB uses a secondary eNB key, the secondary eNB comprising:
  at least one processor;
  and at least one memory including computer program code;
  the at least one memory and the computer program code configured to, with the at least one processor, cause the secondary eNB at least to:
    receive a new secondary eNB key from the master eNB;
    send a key refresh acknowledgment to the master eNB, which includes configuration information used by the user equipment to access the secondary eNB;
    receive a key fresh complete from the master eNB, which indicates the user equipment has refreshed the secondary eNB key;
    implement a random access procedure with the user equipment; and
    refresh the secondary eNB key with the new secondary eNB key, and implementing data transmission with the user equipment with the new secondary eNB key.

5. A method, in a user equipment in a dual connectivity communication scenario, of refreshing a key, wherein the user equipment, a master evolved node B (eNB) and a secondary eNB form dual connectivity, a user plane architecture 1A is applied for the dual connectivity, and the master eNB uses a master eNB key, the secondary eNB uses a secondary eNB key, the method comprises:
  receiving a first Radio Resource Control (RRC) connection reconfiguration from the master eNB, which indicates the user equipment to refresh the master eNB key;
  generating a new master eNB key based on a root key, and refreshing the master eNB key with the new master eNB key, and sending a first RRC connection reconfiguration complete to the master eNB, which indicates the user equipment has refreshed the master eNB key;
  receiving a second RRC connection reconfiguration from the master eNB, which indicates the user equipment to refresh the secondary eNB key and includes the configuration information used by the user equipment to access the secondary eNB;

generating a new secondary eNB key based on the new master eNB key and a freshness value, and refreshing the secondary eNB key with the new secondary eNB key, and sending a second RRC connection reconfiguration complete to the master eNB, which indicates the user equipment has refreshed the secondary eNB key;

implementing a random access procedure with the secondary eNB based on the configuration information; and conducting Packet Data Convergence Protocol (PDCP) reestablishment for a bear served by the secondary eNB and implementing data transmission with the secondary eNB with the new secondary eNB key.

6. A method according to claim 5, wherein the data transmission with the secondary eNB is suspended after receiving the first RRC connection reconfiguration and before receiving the second RRC connection reconfiguration.

7. A method according claim 5, wherein
the second RRC connection reconfiguration further includes the freshness value; or
generating a new secondary eNB key based on a new master eNB key and a freshness value further includes generating the freshness value based on a predetermined rule, wherein the predetermined rule includes the freshness value increases a predetermined value each time when the secondary eNB key needs to be refreshed.

8. A method, in a master evolved node B (eNB) in a dual connectivity communication scenario, of refreshing a key, wherein a user equipment, the master eNB and a secondary eNB form dual connectivity, a user plane architecture 1A is applied for the dual connectivity, and the master eNB uses a master eNB key, the secondary eNB uses a secondary eNB key, the method comprises:

generating a new secondary eNB key based on a new master eNB key and a freshness value, and sending the new secondary eNB key to the secondary eNB;

receiving a key refresh acknowledgment from the secondary eNB, which includes configuration information used by the user equipment to access the secondary eNB;

sending a Radio Resource Control (RRC) connection reconfiguration to the user equipment, which indicates the user equipment to refresh the master eNB key and the secondary eNB key and includes the configuration information used by the user equipment to access the secondary eNB;

refreshing the master eNB key with the new master eNB key, and receiving a RRC connection reconfiguration complete from the user equipment, which indicates the user equipment has refreshed the master eNB key and the secondary eNB key; and sending a key fresh complete to the secondary eNB, which indicates the user equipment has refreshed the secondary eNB key.

9. A method according to claim 8, wherein the second RRC connection reconfiguration further includes the freshness value.

10. A method, in a secondary evolved node B (eNB) in a dual connectivity communication scenario, of refreshing a key, wherein a user equipment, a master eNB and the secondary eNB form dual connectivity, a user plane architecture 1A is applied for the dual connectivity, and the master eNB uses a master eNB key, the secondary eNB uses a secondary eNB key, the method comprises:

receiving a new secondary eNB key from the master eNB;

sending a key refresh acknowledgment to the master eNB, which includes configuration information used by the user equipment to access the secondary eNB;

receiving a key fresh complete from the master eNB, which indicates the user equipment has refreshed the secondary eNB key;

implementing a random access procedure with the user equipment; and refreshing the secondary eNB key with the new secondary eNB key, and implementing data transmission with the user equipment with the new secondary eNB key.

11. A method, in a user equipment in a dual connectivity communication scenario, of refreshing a key, wherein the user equipment, a master evolved node B (eNB) and a secondary eNB form dual connectivity, a user plane architecture 1A is applied for the dual connectivity, and the master eNB uses a master eNB key, the secondary eNB uses a secondary eNB key, the method comprises:

receiving a Radio Resource Control (RRC) connection reconfiguration from the master eNB, which indicates the user equipment to refresh the master eNB key and the secondary eNB key and includes configuration information used by the user equipment to access the secondary eNB;

implementing a random access procedure with the secondary eNB based on the configuration information;

generating a new master eNB key based on a root key, generating a new secondary eNB key based on the new master eNB key and a freshness value, and refreshing the master eNB key with the new master eNB key, refreshing the secondary eNB key with the new secondary eNB key, and sending a RRC connection reconfiguration complete to the master eNB, which indicates the user equipment has refreshed the master eNB key and the secondary eNB key; and conducting Packet Data Convergence Protocol (PDCP) reestablishment for a bear served by the secondary eNB and implementing data transmission with the secondary eNB with the new secondary eNB key.

12. A method, in a master evolved node B (eNB) in a dual connectivity communication scenario, of refreshing a key, wherein a user equipment, the master eNB and a secondary eNB form dual connectivity, a user plane architecture 1A is applied for the dual connectivity, and the master eNB uses a master eNB key, the secondary eNB uses a secondary eNB key, the method comprises:

sending a first Radio Resource Control (RRC) connection reconfiguration to the user equipment, which indicates the user equipment to refresh the master eNB key;

sending a dual connection release request to the secondary eNB;

refreshing the master eNB key with the new master eNB key, and receiving a first RRC connection reconfiguration complete from the user equipment, which indicates the user equipment has refreshed the master eNB key;

receiving a release response from the secondary eNB, which indicates that the secondary eNB has released the dual connection;

generating a new secondary eNB key based on the new master eNB key and a freshness value, and sending a dual connection establish request to the secondary eNB, which includes the new secondary eNB key;

receiving a dual connection establish response from the secondary eNB, which includes configuration information used by the user equipment to access the secondary eNB;

sending a second RRC connection reconfiguration to the user equipment, which includes the configuration information used by the user equipment to access the secondary eNB;

receiving a second RRC connection reconfiguration complete from the user equipment, which indicates the user equipment has configured the configuration information; and sending a dual connection configuration complete to the secondary eNB, which indicates dual connection configuration is completed.

13. A method according to claim 12, wherein the first RRC connection reconfiguration further indicates the user equipment to release configuration associated with the secondary eNB.

14. A method, in a secondary evolved node B (eNB) in a dual connectivity communication scenario, of refreshing a key, wherein a user equipment, a master eNB and the secondary eNB form dual connectivity, a user plane architecture 1A is applied for the dual connectivity, and the master eNB uses a master eNB key, the secondary eNB uses a secondary eNB key, the method comprises:

receiving a dual connection release request from the master eNB;

releasing the dual connection, and sending a release response to the master eNB, which indicates that the secondary eNB has released the dual connection;

receiving a dual connection establish request from the master eNB, which includes the new secondary eNB key;

sending a dual connection establish response to the master eNB, which includes configuration information used by the user equipment to access the secondary eNB;

receiving a dual connection configuration complete from the master eNB, which indicates dual connection configuration is completed;

implementing a random access procedure with the user equipment; and implementing data transmission with the user equipment with the new secondary eNB key.

15. A method, in a user equipment in a dual connectivity communication scenario, of refreshing a key, wherein the user equipment, a master evolved node B (eNB) and a secondary eNB form dual connectivity, a user plane architecture 1A is applied for the dual connectivity, and the master eNB uses a master eNB key, the secondary eNB uses a secondary eNB key, the method comprises:

receiving a first Radio Resource Control (RRC) connection reconfiguration from the master eNB, which indicates the user equipment to refresh the master eNB key;

releasing configuration associated with the secondary eNB;

generating a new master eNB key based on a root key, refreshing the master eNB key with the new master eNB key, and sending a first RRC connection reconfiguration complete to the master eNB, which indicates the user equipment has refreshed the master eNB key;

receiving a second RRC connection reconfiguration from the master eNB, which includes the configuration information used by the user equipment to access the secondary eNB;

generating a new secondary eNB key based on the new master eNB key and a freshness value, and sending a second RRC connection reconfiguration complete to the master eNB, which indicates the user equipment has configured the configuration information;

implementing a random access procedure with the secondary eNB based on the configuration information; and conducting Packet Data Convergence Protocol (PDCP) reestablishment for a bear served by the secondary eNB and implementing data transmission with the secondary eNB with the new secondary eNB key.

* * * * *